(12) United States Patent
Yoneyama

(10) Patent No.: US 11,691,287 B2
(45) Date of Patent: Jul. 4, 2023

(54) ROBOT SYSTEM

(71) Applicant: FANUC CORPORATION, Yamanashi (JP)

(72) Inventor: Hiroyuki Yoneyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 219 days.

(21) Appl. No.: 17/022,959

(22) Filed: Sep. 16, 2020

(65) Prior Publication Data
US 2021/0101282 A1    Apr. 8, 2021

(30) Foreign Application Priority Data
Oct. 8, 2019    (JP) .................. 2019-184931

(51) Int. Cl.
*B25J 9/16*      (2006.01)
*B25J 9/00*      (2006.01)

(52) U.S. Cl.
CPC ........... *B25J 9/1671* (2013.01); *B25J 9/0081* (2013.01); *B25J 9/161* (2013.01); *B25J 9/1653* (2013.01); *B25J 9/1666* (2013.01)

(58) Field of Classification Search
CPC combination set(s) only.
See application file for complete search history.

(56) References Cited

U.S. PATENT DOCUMENTS

2017/0165841 A1\*  6/2017  Kamoi ................. B25J 9/1671
2018/0021952 A1\*  1/2018  Fujieda ............... B25J 9/1671
                                                      700/264

FOREIGN PATENT DOCUMENTS

| JP | 2012-218120 A | 11/2012 |
| JP | 2014-180707 A | 9/2014 |
| JP | 2019-034352 A | 3/2019 |
| JP | 2019-081242 A | 5/2019 |

\* cited by examiner

*Primary Examiner* — Bao Long T Nguyen
(74) *Attorney, Agent, or Firm* — Studebaker & Brackett PC

(57) ABSTRACT

The invention provides a robot system that enables easy, efficient, and precise checking through simulation. The invention includes a virtual model display unit configured to place virtual models in a virtual space on a screen and display the virtual models simultaneously with real equipment; a robot program teaching unit configured to perform teaching of a robot program in the virtual space; a real space virtual model display unit configured to display the virtual models and teaching points of the robot program in a real space, based on a positional relationship in the virtual space; and a virtual model placement position correcting unit configured to correct placement positions of the virtual models to match the real equipment in the real space.

5 Claims, 11 Drawing Sheets

REAL SPACE ered out.
ROBOT SYSTEM

BACKGROUND OF THE INVENTION

This application is based on and claims the benefit of priority from Japanese Patent Application No. 2019-184931, filed on 8 Oct. 2019, the content of which is incorporated herein by reference.

Field of the Invention

The present invention relates to a robot system.

Related Art

In robot systems such as industrial robots, technology utilizing augmented reality (AR) is gaining attention, with an abundance of research and development being carried out.

This kind of robot system includes, for example, a configuration in which a Computer Generated (CG) image of a robot is generated based on an image of the robot captured by an imaging device, and a user performs a touch operation on the CG image displayed on a touchscreen to virtually operate the CG image robot on the touchscreen, whereby the actual robot is operated in tandem with the operation of the virtual robot.

There is also technology for placing and simultaneously displaying three-dimensional models of a robot equipped with a tool, a workpiece, and peripheral devices, etc. on a screen, to perform teaching or simulation of a robot program.

Japanese Unexamined. Patent Application, Publication No. 2019-081242 discloses "A simulation device, which allows a virtual robot to perform a simulation, comprises: a receiving section that receives input of information related to whether or not an object to be virtualized is operated in tandem with motion of the virtual robot and input of information related to an attachment section at which the object to be virtualized is attached to the virtual robot; the virtual robot; and a control section that makes a display section to display the object to be virtualized attached to the attachment section received by the receiving section, and when the receiving section receives the input of information related to whether or not the object to be virtualized is operated in tandem with motion of the virtual robot, operates the object to be virtualized in tandem with motion of the virtual robot".

Japanese Unexamined Patent Application, Publication No. 2019-034352 discloses "A simulation device performing a simulation by a virtual robot obtained by virtualizing a robot comprises a control part capable of executing an operation instruction for operating the virtual robot in a state where a virtual object is held by the virtual robot on the basis of information related to an external point located at a position different from the virtual robot in a space on the simulation and information related to a line segment possessed by an outer shape of the virtual object. The control part, in operation of the virtual robot, outputs a signal for causing a display part to display a first locus on the basis of the external point on the virtual object".

Patent Document 1: Japanese Unexamined Patent Application, Publication No. 2019-081242
Patent Document 2: Japanese Unexamined Patent Application, Publication No. 2019-034352

SUMMARY OF THE INVENTION

However, when applying a robot program created an a virtual space to a real site, there is a possibility of interference occurring due to a placement error in the layout between the virtual space and the real space. There was thus a problem in that applying the robot program to a real site required checking the teaching points of the robot program one point at a time to make corrections, or performing a calibration by, for example, three-point touchup, to teach the program to the robot in the virtual space after matching the layouts of the virtual space and the real space, which took a lot of man-hours and required considerable time and effort.

One aspect of a robot system according to the present disclosure is configured to be a robot system including a simulation device configured to place virtual models including at least a virtual robot model on a screen, display the virtual model simultaneously with a real equipment including at least a real robot, and perform teaching and simulation of a robot program, the simulation device including a virtual model display unit configured to place virtual models in a virtual space on a screen and display the virtual models simultaneously with real equipment; a robot program teaching unit configured to perform teaching of a robot program in the virtual space; a real space virtual model display unit configured to display the virtual models and teaching points of the robot program in a real space, based on a positional relationship in the virtual space; and virtual model placement position correcting unit configured to correct placement positions of the virtual models to match the real equipment in the real space.

According to one aspect of the system according to the present disclosure, it is possible to perform automatic correction of a robot program on site, and to perform a check through simulation.

This makes it possible, when applying a robot program created in a virtual space to a real site, to obviate the necessity of the conventional art to check the teaching points of the robot program one point at a time to make corrections, or to perform a calibration by three-point touchup, to teach the program to the robot in the virtual space after matching the layouts of the virtual space and the real space. Thus, compared to the conventional art, the required man-hours, time, and effort can be reduced.

DETAILED DESCRIPTION OF THE INVENTION

A robot system according to an embodiment of the present invention is described below with reference to FIG. 1 to FIG. 11.

Figure 1:
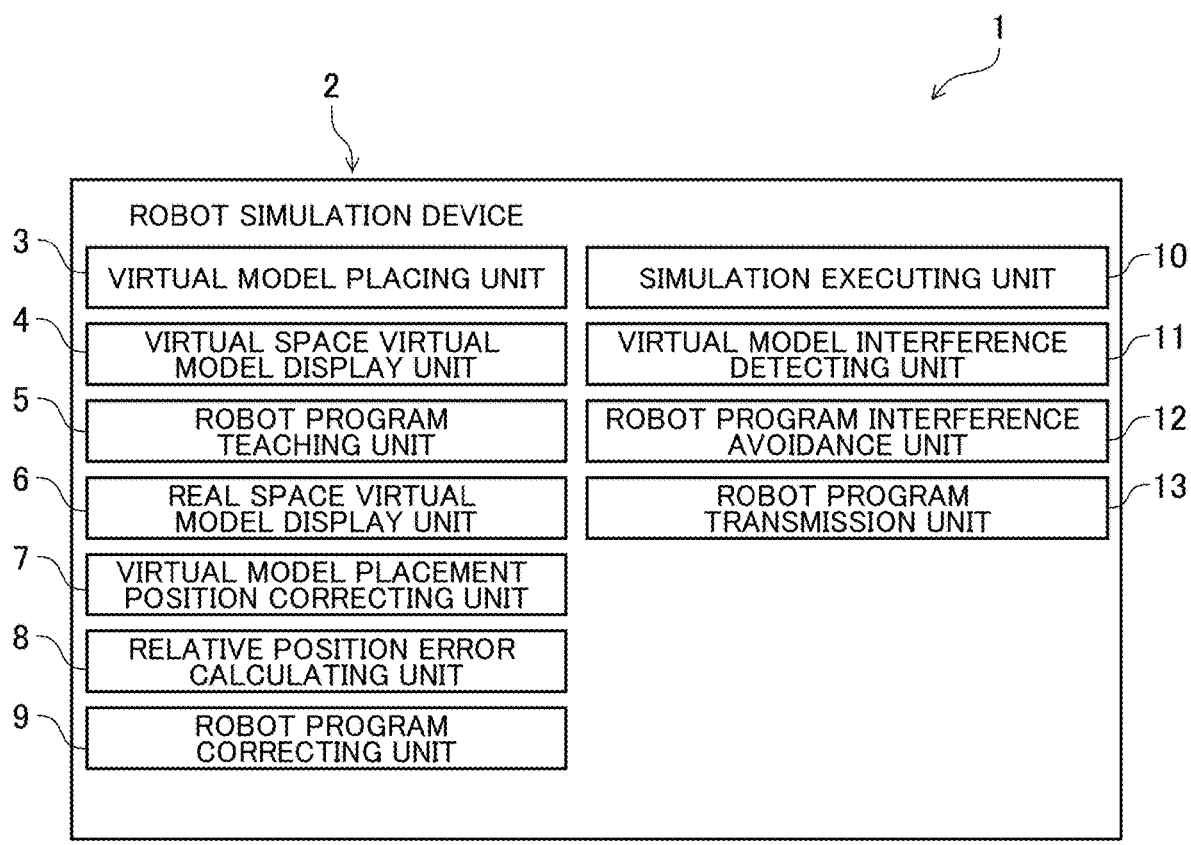
FIG. 1 is a block diagram showing a robot system (simulation device) according to an aspect of the invention.

As shown in FIG. 1, the robot system 1 according to the present embodiment includes a simulation device 2 that places and simultaneously displays a virtual robot model equipped with a virtual tool model, a virtual workpiece model, and virtual peripheral device models (hereinafter, these models may be referred to as virtual models) on a screen, to perform teaching or simulation of a robot program.

Specifically, the simulation device 2 according to the present embodiment is configured to include a virtual model display unit 4 (including a virtual model placing unit 3) that places and simultaneously displays virtual models in a virtual space on a screen, a robot program teaching unit 5 that performs teaching of a robot program in the virtual space, a real space virtual model display unit 6 that displays the virtual models and teaching points of the robot program in a real space based on their positional relationship in the virtual space, a virtual model placement position correcting unit 7 that corrects the placement positions of the virtual models to match a real robot equipped with a real tool, a real workpiece, and real peripheral devices (hereinafter, this equipment may be referred to as real equipment) in the real space, a real equipment display unit (virtual model placing unit 3) that displays the virtual models overlapping the real equipment, a relative position error calculating unit 8 that calculates a relative position error from relative positions of the virtual models before correction and relative positions of the virtual models after correction, and a robot program correcting unit 9 that corrects the teaching points of the robot program based on the relative position error.

Further, the simulation device 2 of the robot system 1 according to the present embodiment includes a simulation executing unit 10 that executes a simulation of the robot program by the virtual models, a virtual model interference detecting unit 11 that detects interference between the virtual models in the simulation of the robot program, a robot program interference avoidance unit 12 that corrects the teaching points of the robot program to avoid interference, and a robot program transmission unit 13 that transmits the robot program to a real robot.

Figure 2:
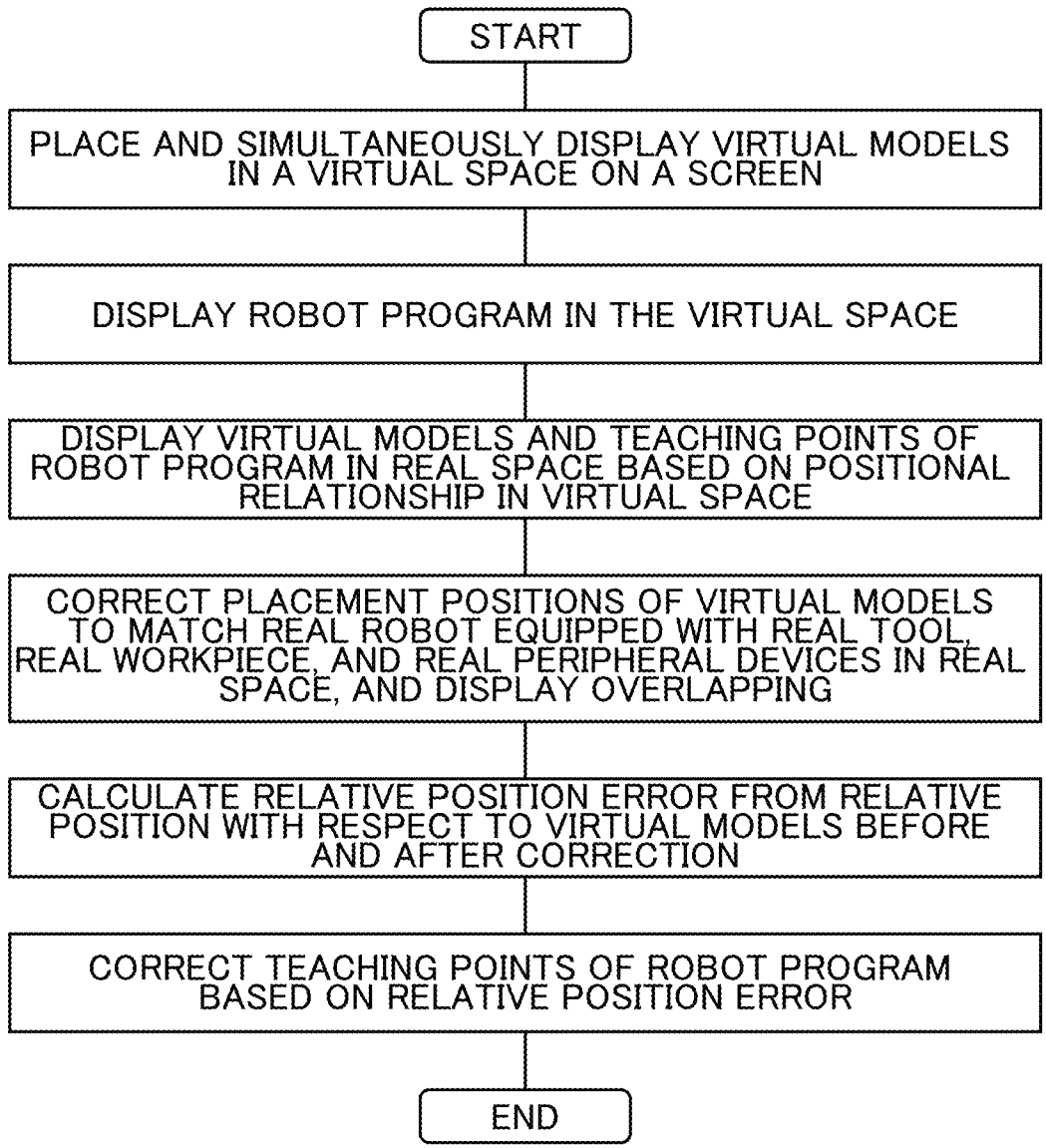
FIG. 2 is a flowchart showing a process of executing a simulation using the robot system. (simulation device) according to an aspect of the invention.
Figure 3:
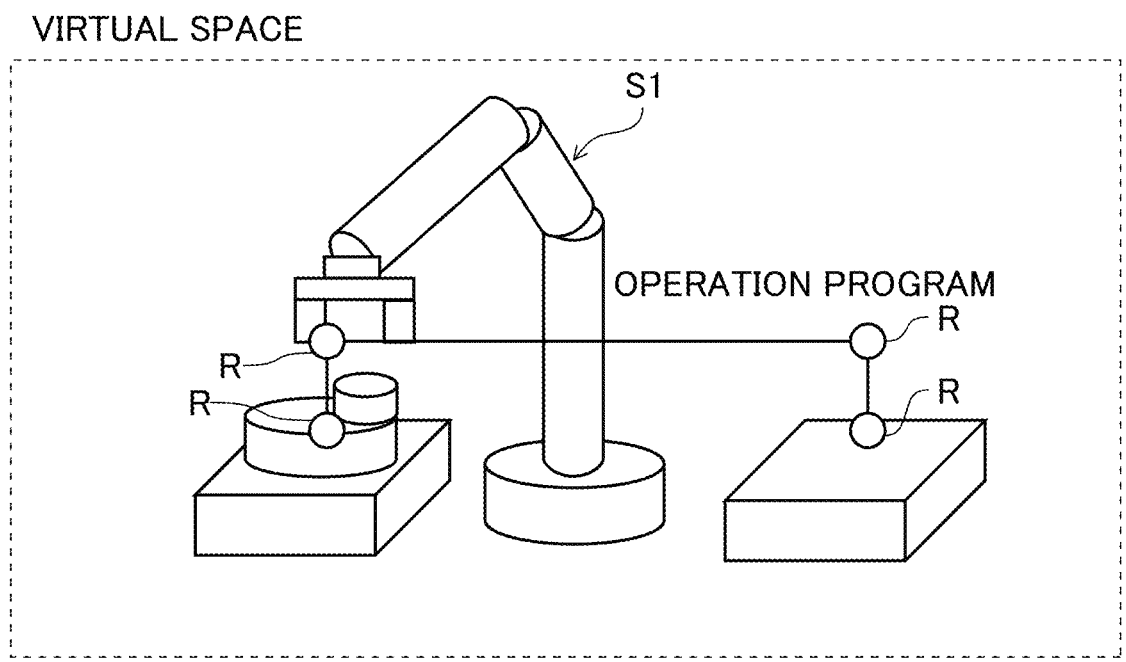
FIG. 3 is a drawing showing a state of placing and simultaneously displaying virtual models on a screen to perform teaching or simulation of a robot program when executing a simulation using the robot system (simulation device) according to an aspect of the invention.

As shown in FIG. 2 and FIG. 3, in the robot system 1 (simulation device 2) according to the present embodiment consisting of the above configuration, virtual models are placed and simultaneously displayed on a screen, and teaching and simulation of the robot program is performed. It is confirmed through simulation that no interference occurs in the robot program created in virtual space.

Figure 4:
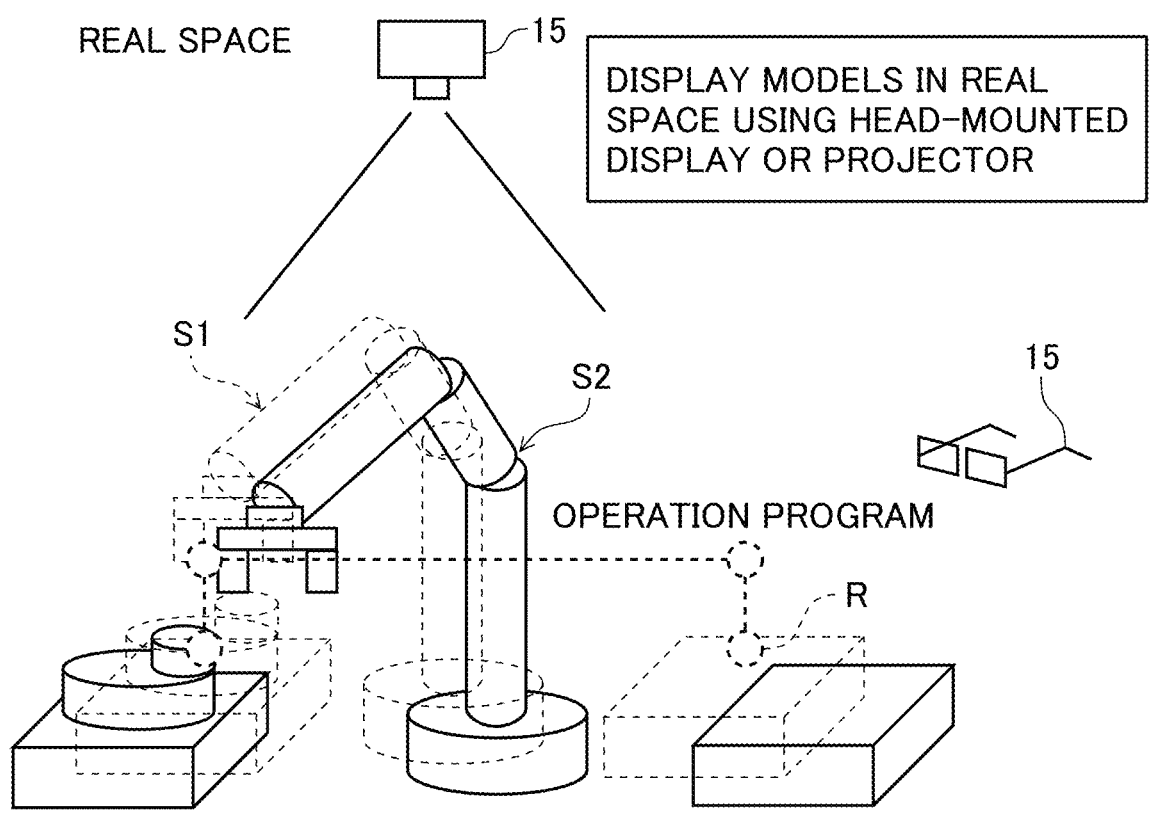
FIG. 4 is a drawing showing a state of displaying teaching points in the real space based on a positional relationship in the virtual space when executing a simulation using the robot system (simulation device) according to an aspect of the invention.

Next, as shown in FIG. 2 and FIG. 4, a virtual robot model equipped with a virtual tool model, a virtual workpiece model, virtual peripheral device models (virtual model S1), and teaching points R of the robot program are displayed in a real space based on their positional relationship in the virtual space. The models are displayed in the real space by using an augmented reality display device 15 such as, for example, a head-mounted display or a projector. The augmented reality display device 15 includes a display unit, a communication unit, a memory unit, etc.

Figure 5:
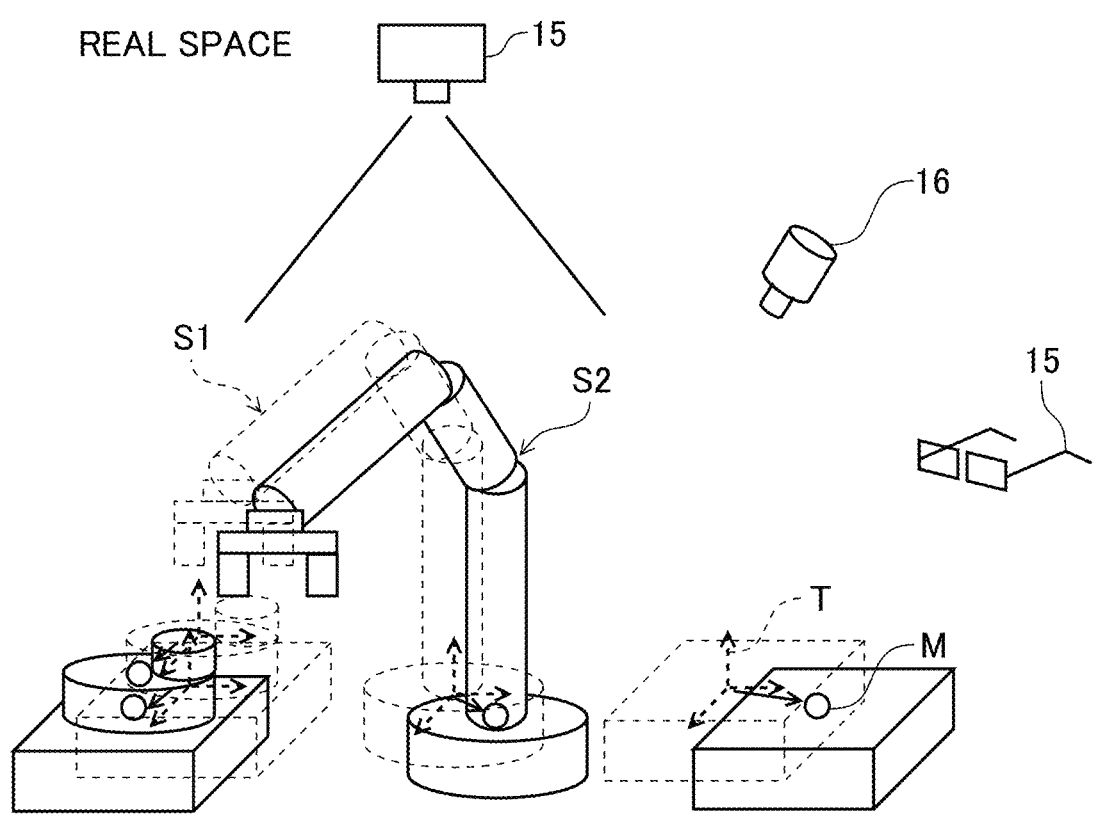
FIG. 5 is a drawing showing a state of changing and correcting relative positions so that placement positions of the virtual models match real equipment S2 by changing and correcting the relative positions thereof when executing a simulation using the robot system. (simulation device) according to an aspect of the invention.

Next, as shown in FIG. 2 and FIG. 5 the virtual model S1 is displayed overlapping a real robot equipped with a real tool, a real workpiece, and real peripheral devices (real equipment S2), with relative positions thereof changed and corrected so that the placement position of the virtual model S1 matches the real equipment S2.

At this time, for example, one or more targets T are placed on each of the virtual robot model equipped with a virtual tool model, the virtual workpiece model, and the virtual peripheral device models (virtual model S1), and one or more markers M corresponding to the targets T are placed on each of the real robot equipped with a real tool, the real workpiece, and the real peripheral devices (real equipment S2). The markers M are detected by a detecting means 16 such as a camera that is built into or provided separately from the augmented reality display device 15 such as a projector or head-mounted display, and the placement position is corrected on the simulation device 2 side so that the targets and markers match one another.

Figure 6:
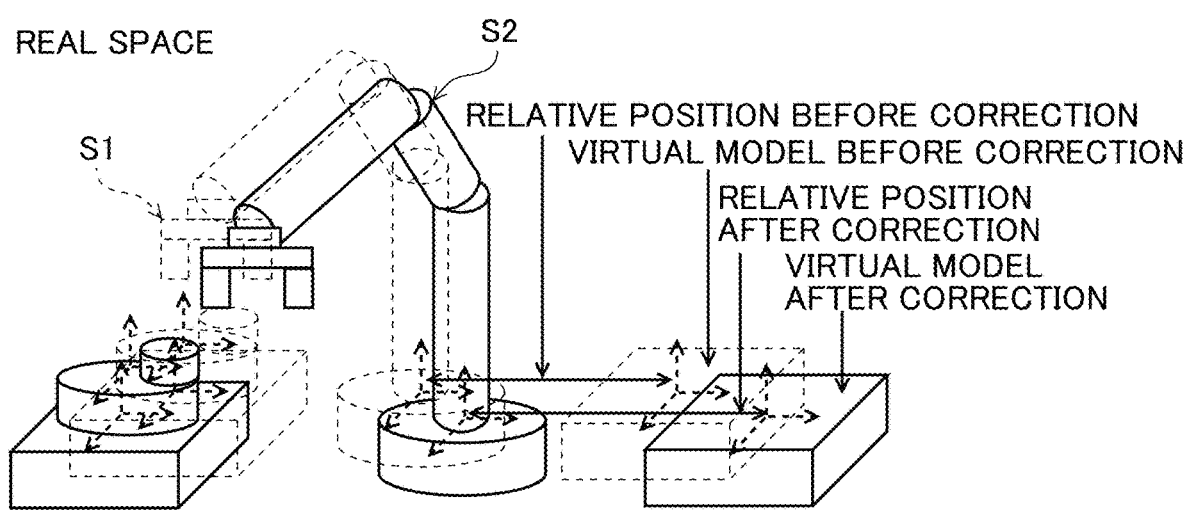
FIG. 6 is a drawing showing a state of calculating a relative position error from relative positions of the virtual models before correction and relative position of the virtual models after correction when executing a simulation using the robot system (simulation device) according to an aspect of the invention.

Next, as shown in FIG. 2 and FIG. 6, a relative position error is calculated from a relative position of the virtual model S1 before correction and a relative position of the virtual model S1 after correction. For example, the markers M are detected by the detecting means 16 such as a camera that is built into or provided separately from the augmented reality display device 15 such as a projector or head-mounted display, and the position of each object of the real equipment S2 and the relative position of each object with respect to the real robot, in other words the position of the virtual model S1 and the relative position of each object with respect to the virtual robot after correction, are calculated. Further, since the position of the virtual model S1 and the relative position of each object with respect to the virtual robot before correction are obvious, the position of the virtual model S1, the relative position of each object with respect to the virtual robot, and the relative position error with respect to the robot before and after correction are calculated.

Figure 7:
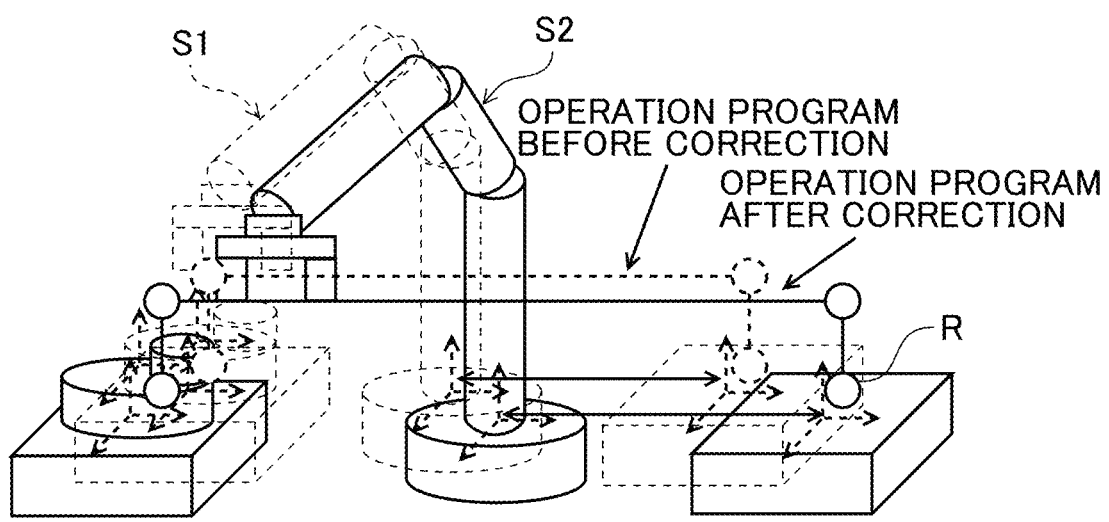
FIG. 7 is a drawing showing a state of correcting the teaching points (program) of the robot program based on the relative position error when executing a simulation using the robot system (simulation device) according to an aspect of the invention.
Figure 8:
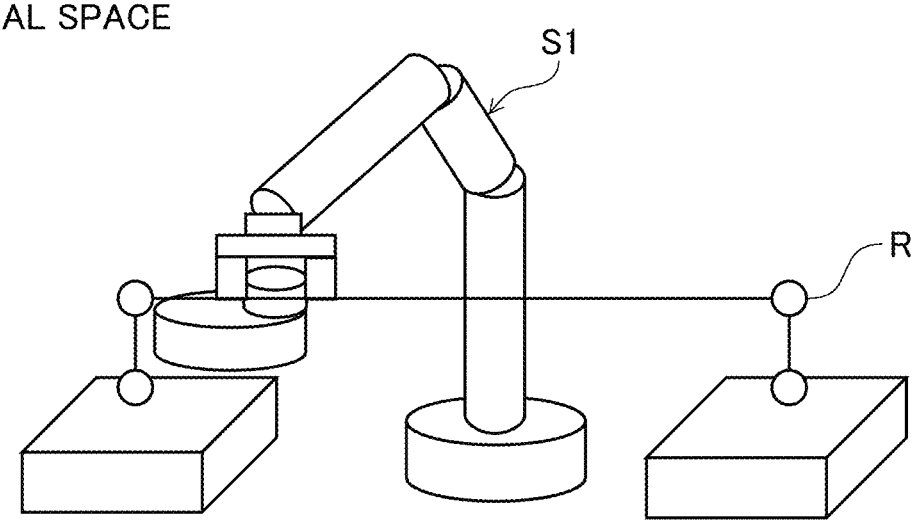
FIG. 8 is a drawing showing a state of performing a simulation with corrected placement positions of the virtual models and corrected teaching points of the robot program when executing a simulation using the robot system (simulation device) according to an aspect of the invention.

Next, as shown in FIG. 2 and FIG. 7, the teaching points (program) of the robot program are corrected based on the relative position error. In addition, as shown in FIG. 8, a simulation of the robot program having the teaching points R corrected is performed with the virtual model S1 having its placement position corrected.

Figure 9:
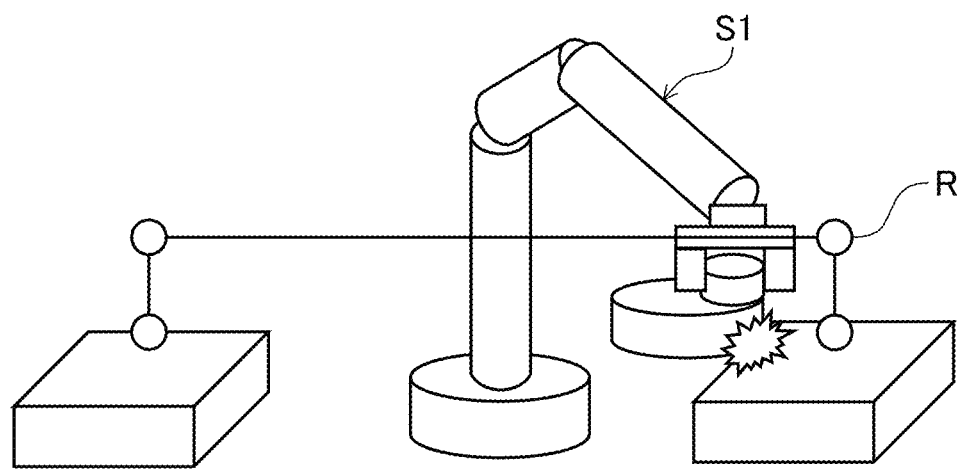
FIG. 9 is a drawing showing a state of interference by the virtual models occurring when executing a simulation using the robot system (simulation device) according to an aspect of the invention.
Figure 10:
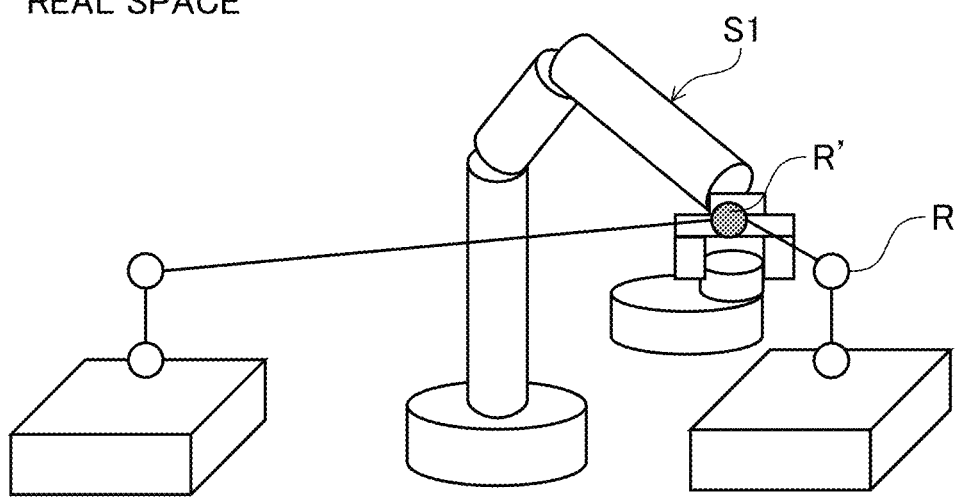
FIG. 10 is a drawing showing a state of correcting the teaching points of the robot program to avoid interference when executing a simulation using the robot system (simulation device) according to an aspect of the invention.

At this time, as shown in FIG. 9 and FIG. 10, if interference occurs in the virtual robot model equipped with the virtual tool model, the virtual workpiece model, and the virtual peripheral device models (virtual model S1) at the time of the simulation, a user may operate a control panel or the like to correct the teaching points R of the robot program to avoid interference. For example, if the virtual workpiece model and the virtual peripheral device models (virtual model S1) interfere with each other when the virtual robot model equipped with the virtual tool model carries the virtual workpiece model, the user may correct the position and orientation of the teaching points R, or insert an additional teaching point R', in order to avoid interference.

Figure 11:
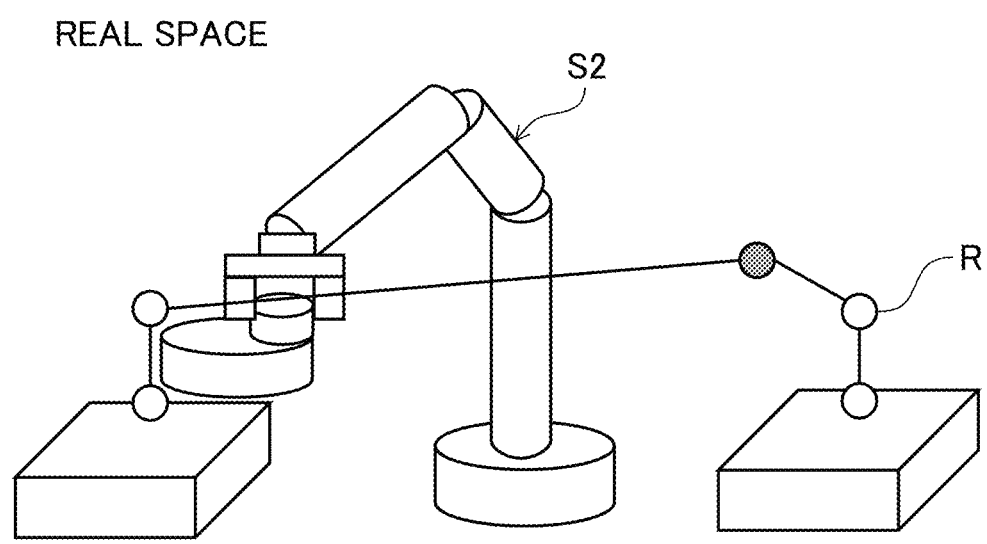
FIG. 11 is a drawing showing a robot program being loaded into a robot of the real equipment and executed.

Once it is confirmed through simulation that interference does not occur, the robot program is loaded into the robot of the real equipment S2 and executed, as shown in FIG. 11.

Thus, the robot system 1 (simulation device 2) according to the present embodiment makes it possible, when applying a robot program created in a virtual space to a real site, to obviate the need to check the teaching points R of the robot program one point at a time at the site to make corrections, or to perform a calibration by, for example, three-point touchup to teach the program to the robot in the virtual space after matching the layouts of the virtual space and the real space, which allows for automatic correction of the robot program on site and performing a check through simulation.

Therefore, according to the robot system 1 (simulation device 2) of the present embodiment, the required man-hours, time, and effort can be reduced compared to the conventional art, and checking through simulation can be performed easily, efficiently, and precisely.

An embodiment of the robot system has been described above, but the invention is not limited to the above embodiment, and various modifications are possible without departing from the spirit and scope of the invention.

EXPLANATION OF REFERENCE NUMERALS

1 Robot system
2 Simulation device
3 Virtual model placing unit
4 Virtual model display unit
5 Robot program teaching unit
6 Real space virtual model display unit
7 Virtual model placement position correcting unit
8 Relative position error calculating unit
9 Robot program correcting unit
10 Simulation executing unit
11 Virtual model interference detecting unit
12 Robot program interference avoidance unit
13 Robot program transmission unit
15 Augmented reality display device
S1 Virtual model
S2 Real equipment
R Teaching point
M Marker
T Target

What is claimed is:

1. A robot system comprising a simulation device configured to place virtual models including at least a virtual robot model on a screen, display the virtual models simultaneously with a real equipment including at least a real robot, and perform teaching and simulation of a robot program,
   the simulation device comprising:
   a processor operable to:
   place the virtual models in a virtual space on the screen and display the virtual models simultaneously with the real equipment;
   perform teaching of the robot program in the virtual space;
   display the virtual models and teaching points of the robot program in a real space, based on a positional relationship in the virtual space; and
   correct placement positions of the virtual models to position the virtual robot model of the virtual models such that at least a part of the virtual robot model having a shape overlaps with a corresponding same part of the real robot having the same shape, and that peripheries of the part of the virtual robot model and peripheries of the corresponding same part of the real robot overlap and are aligned with each other in the real space.

2. The robot system according to claim 1, wherein the processor is operable to:
   calculate a relative position error from relative positions of the virtual models before and after correction; and
   correct the teaching points of the robot program based on the relative position error.

3. The robot system according to claim 2, wherein the processor is operable to:
   execute a simulation of the robot program by the virtual models;
   detect interference between the virtual models in the simulation of the robot program; and
   correct the teaching points of the robot program to avoid interference.

4. The robot system according to claim 3, the processor is operable to transmit the robot program to the real robot.

5. The robot system according to claim 1, wherein the virtual robot model includes at least one target, and the real robot includes at least one marker corresponding to the at least one target, and
   the processor corrects the placement positions of the virtual models such that the at least one target and the at least one marker overlap and are placed at a same position.

* * * * *